United States Patent
Simcoe

(10) Patent No.: US 9,143,553 B2
(45) Date of Patent: Sep. 22, 2015

(54) TRIVIAL FILE TRANSFER PROTOCOL (TFTP) ACCELERATED FILE RETRY OPTION

(71) Applicant: Honeywell International Inc., Morristown, NJ (US)

(72) Inventor: Nathaniel John Simcoe, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 94 days.

(21) Appl. No.: 13/777,397

(22) Filed: Feb. 26, 2013

(65) Prior Publication Data
US 2014/0244797 A1    Aug. 28, 2014

(51) Int. Cl.
G06F 15/16    (2006.01)
G06F 15/173   (2006.01)
H04L 29/08    (2006.01)
H04L 29/06    (2006.01)

(52) U.S. Cl.
CPC .............. *H04L 67/06* (2013.01); *H04L 69/22* (2013.01)

(58) Field of Classification Search
USPC ......... 709/219, 228, 230, 203, 245, 231, 217, 709/220, 227, 232, 241, 212
See application file for complete search history.

(56) References Cited

U.S. PATENT DOCUMENTS

| | | | |
|---|---|---|---|
| 6,049,826 A | 4/2000 | Beser | |
| 6,185,623 B1 | 2/2001 | Bailey et al. | |
| 6,185,678 B1 | 2/2001 | Arbaugh et al. | |
| 6,345,302 B1 | 2/2002 | Bennett et al. | |
| 6,968,386 B1 | 11/2005 | Benayoun et al. | |
| 6,976,058 B1 | 12/2005 | Brown et al. | |
| 7,203,615 B2 | 4/2007 | Mao et al. | |
| 7,346,672 B2 | 3/2008 | Harvey, IV | |
| 7,379,982 B2 | 5/2008 | Tabbara | |
| 7,395,344 B2 | 7/2008 | Sandell et al. | |
| 7,984,166 B2 * | 7/2011 | Simcoe et al. | 709/228 |
| 8,347,341 B2 * | 1/2013 | Markley et al. | 725/82 |
| 2003/0065808 A1 * | 4/2003 | Dawson | 709/232 |
| 2003/0182404 A1 | 9/2003 | Saint-Etienne et al. | |
| 2004/0267960 A1 * | 12/2004 | Riedle | 709/241 |
| 2005/0177625 A1 | 8/2005 | Paek et al. | |
| 2005/0267860 A1 | 12/2005 | Benguigui | |

(Continued)

OTHER PUBLICATIONS

U.S. Patent and Trademark Office, "Notice of Allowance", "U.S. Appl. No. 12/552,668", May 17, 2011, pp. 1-15.

(Continued)

*Primary Examiner* — Jude Jean Gilles
(74) *Attorney, Agent, or Firm* — Fogg & Powers LLC

(57) ABSTRACT

A method of transferring data using a Trivial File Transport Protocol (TFTP) includes sending first request packet from client to server, first request packet requesting that first file be transferred; transferring first file according to first request packet if first acknowledgement packet is received at client from server indicating that server can accommodate request of first request packet; sending second request packet from client to the server if transfer of first file does not complete successfully, the second request packet including TFTP option indicating that transfer of first file be retried beginning at first block after final block that was successfully transferred in response to first request packet; and retrying transfer of first file according to second request packet if second acknowledgement packet is received at client from server indicating that server can accommodate request of second request packet.

17 Claims, 10 Drawing Sheets

(56) References Cited

U.S. PATENT DOCUMENTS

| | | |
|---|---|---|
| 2006/0031748 A1 | 2/2006 | Brady, Jr. et al. |
| 2007/0083628 A1 | 4/2007 | Sandstrom |
| 2007/0130281 A1 | 6/2007 | Sandell |
| 2008/0056266 A1* | 3/2008 | Lin ............................ 370/392 |
| 2008/0250155 A1 | 10/2008 | Wang et al. |
| 2009/0045981 A1 | 2/2009 | Jean et al. |

OTHER PUBLICATIONS

U.S. Patent and Trademark Office, "Office Action", "U.S. Appl. No. 12/522,668", Dec. 9, 2010, pp. 1-16.

Finlayson, Ross, "Bootstrap Loading Using TFTP", "http://www.rfc-editor.org/rfc/rfc906.txt", Jun. 1984.

Malkin et al., "TFTP Blocksize Option", "http://www.rfc-editor.org/rfc/rfc2348.txt", May 1998, Publisher: The Internet Society.

Malkin, G. and A. Harkin, "TFTP Option Negotiation Analysis", "http://www.rfc-editor.org/rfc/rfc1785.txt", Mar. 1995.

Malkin, G., "TFTP Option Extension", "http://www.rfc-editor.org/rfc/rfc2347.txt", May 1998, Publisher: The Internet Society.

Sollins, K.R., "The TFTP Protocol Revision 2", "http://www.rfc-editor.org/rfc/rfc783.txt", Jun. 1981.

Sollins, K., "The TFTP Protocol Revision 2", "http://www.rfc-editor.org/rfc/rfc1350.txt", Jul. 1992.

Malkin, G., "TFTP Timeout Interval and Transfer Size Options", "http://www.rfc-editor.org/rfc/rfc2349.txt", May 1998, Publisher: The Internet Society.

European Patent Office, "EP Office Action from EP Application No. 14154222.5 mailed Jan. 8, 2015", "from Foreign Counterpart of U.S. Appl. No. 13/777,397", Jan. 8, 2015, pp. 16, Published in: EP.

European Patent Office, "EP Search Report from EP Application No. 14154222.5 mailed Sep. 12, 2014", "from Foreign Counterpart of U.S. Appl. No. 13/777,397", Sep. 12, 2014, pp. 13, Published in: EP.

Johnston, "TFTP Streaming Definition", Jun. 2003, pp. 128, Publisher: http://tools.ietf.org/id/draft-johnston-tftp-stream-00.txt.

Johnston, "TFTP Restart and Session Option Definitions", "http://tools.ietf.org/id/draft-johnston-tftp-restart-session-00.txt", Jun. 2003.

* cited by examiner

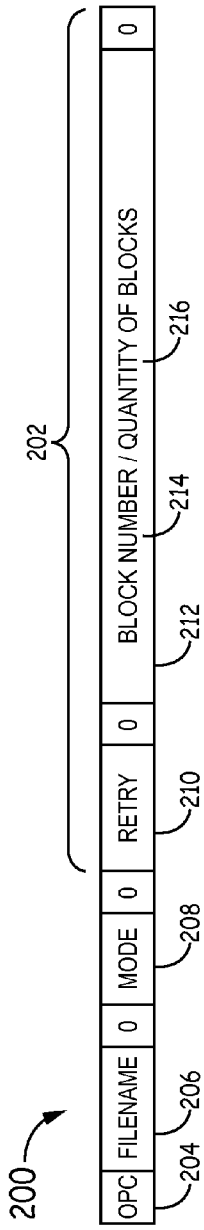
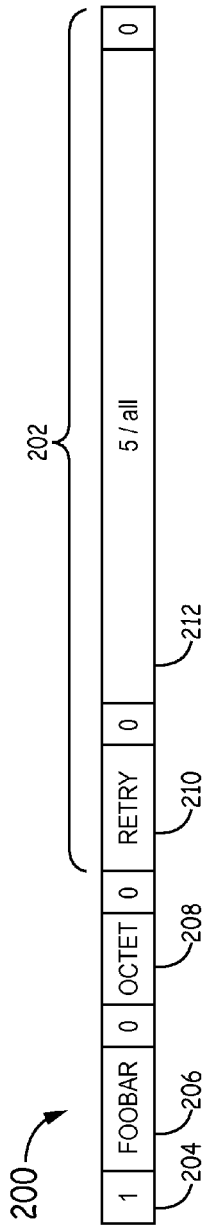
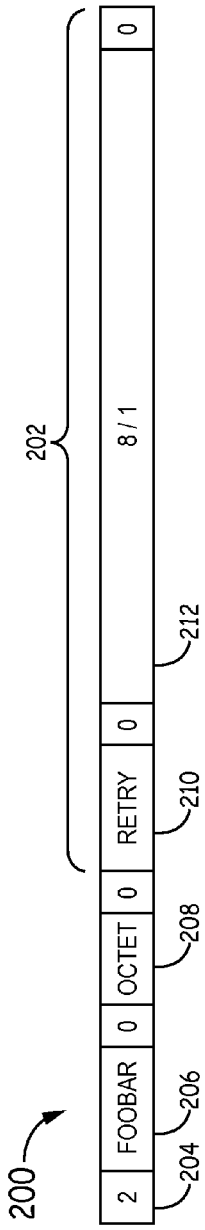
FIG. 2A
FIG. 2B
FIG. 2C

TRIVIAL FILE TRANSFER PROTOCOL (TFTP) ACCELERATED FILE RETRY OPTION

BACKGROUND

The Trivial File Transfer Protocol (TFTP) is a simple file transfer protocol that is widely used. TFTP can be used by a first TFTP agent (also referred to here as a "TFTP client") to write a file to a second TFTP agent (also referred to here as a "TFTP server"). TFTP can also be used by a TFTP client to read a file from a TFTP server. The details of TFTP are defined in various Internet Engineering Task Force (IETF) Request for Comments (RFC) documents, including RFC 783 (TFTP Protocol (revision 1)), RFC 1350 (TFTP Protocol (revision 2)), RFC 906 (Bootstrap loading using TFTP), RFC 1785 (TFTP Option Negotiation Analysis), RFC 2347 (TFTP Option Extension), RFC 2348 (TFTP Blocksize Option), and RFC 2349 (TFTP Timeout Interval and Transfer Size Options). The TFTP described in such IETF RFC documents is also referred to here as "standard TFTP." Some avionics standards, such as Aeronautical Radio, Incorporated (ARINC) Standard 615A, specify that standard TFTP can be used for loading data from a file stored in a file system into the memory of a target device. This type of transfer is also referred to here as "data loading."

SUMMARY

A method of transferring data using a Trivial File Transport Protocol (TFTP) includes sending a first request packet from a client to a server, the first request packet requesting that a first file be transferred; transferring the first file according to the first request packet if a first acknowledgement packet is received at the client from the server indicating that the server can accommodate request of the first request packet; sending a second request packet from the client to the server if transfer of the first file does not complete successfully, the second request packet including a TFTP option indicating that transfer of the first file be retried beginning at a first block after a final block that was successfully transferred in response to the first request packet; and retrying the transfer of the first file according to the second request packet if a second acknowledgement packet is received at the client from the server indicating that the server can accommodate the request of the second request packet.

The details of various embodiments of the claimed invention are set forth in the accompanying drawings and the description below. Other features and advantages will become apparent from the description, the drawings, and the claims.

DRAWINGS

FIG. 2A illustrates one embodiment of a Trivial File Transfer Protocol (TFTP) request packet to which an accelerated file retry option has been appended.

FIGS. 2B-2C illustrate various examples of a TFTP request packets having an accelerated file retry option appended thereto.

Like reference numbers and designations in the various drawings indicate like elements.

DETAILED DESCRIPTION

Figure 1:
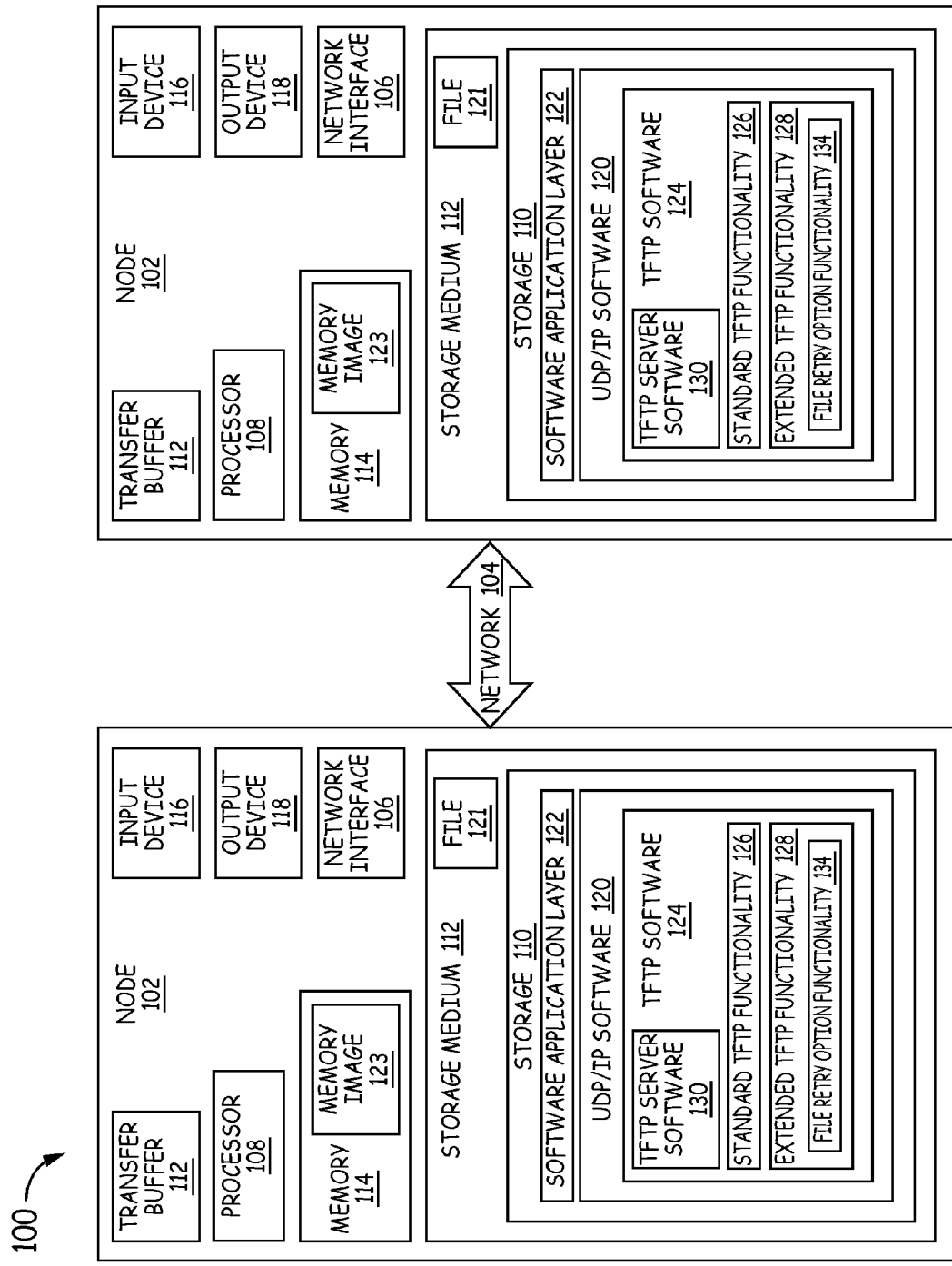
FIG. 1 is a block diagram of one embodiment of a system that employs extended TFTP functionality to transfer data.

FIG. 1 is a block diagram of one embodiment of a system 100 that employs extended TFTP functionality to transfer data. The system 100 comprises at least two nodes 102 that are communicatively coupled to one another using at least one network 104, which can be implemented using wired and/or wireless communication links. Each node 102 includes an appropriate network interface 106 to communicatively couple the respective node 102 to the network 104. In one implementation of such an embodiment, the network 104 is implemented, at least in part, using an Ethernet local area network (LAN). As described in more detail below, the nodes 102 use the User Datagram Protocol/Internet Protocol (UDP/IP) suite of protocols to communicate over the network 104.

In the embodiment shown in FIG. 1, each of the nodes 102 further comprises one or more processors 108 for executing software 110. The software 110 in each node 102 comprises program instructions that are stored (or otherwise embodied) on or in an appropriate storage medium or media 112 (such as flash or other non-volatile memory, magnetic disc drives, and/or optical disc drives) from which at least a portion of the program instructions are read by the processor 108 for execution thereby. Although the storage media 112 is shown in FIG. 1 as being included in, and local to, the respective node 102, it is to be understood that removable media and/or remote storage media (for example, storage media that is accessible over the network 104) can also be used. Each node 102 also includes memory 114 for storing the program instructions (and any related data) during execution by the processor 108. Memory 114 comprises, in one implementation, any suitable form of random access memory (RAM) now known or later developed, such as dynamic random access memory (DRAM). In other embodiments, other types of memory are used.

Each node 102 further includes one or more input devices 116 that are communicatively coupled to the respective processor 108 by which a user is able to provide input to that processor 108. Examples of input devices include a keyboard, keypad, touch-pad, pointing device, button, switch, and microphone. Each node 102 also includes one or more output devices 118 that are communicatively coupled to the respective processor 108. Each processor 108 is able to output information or data to a user on or using one or more of the output devices 108. Examples of output devices 118 include visual output devices such as liquid crystal displays (LCDs) or light emitting diodes (LEDs) or audio output devices such as speakers.

The software 110 executed by the processor 108 in each node 102 includes UDP/IP software 120 (also referred to here as the "UDP/IP stack"). The UDP/IP software 120 implements the UDP/IP suite of protocols and enables application-layer software 122 to communicate over the network 104 using the UDP/IP suite of protocols. In the embodiment shown in FIG. 1, the UDP/IP software 120 includes TFTP software 124. In general, the TFTP software 124 includes standard TFTP functionality 126 that implements standard TFTP (as described above) and extended TFTP functionality 128 that implements TFTP features that are not described in the documents that define standard TFTP. The TFTP software 124 can be implemented, for example, by extending or modifying software that implements standard TFTP to further include the extended TFTP functionality 128 described here.

The TFTP software 124 is used to transform the state of, for example, a particular storage device (for example, storage medium 112 and/or memory 114) by transferring data that is stored in that storage device. In one example, a file 121 is transferred from one node 102 to a second node 102 and is stored on a storage medium 112 in the second node 102 using a file system. In another example, a memory image 123 (that is, the contents of the memory 114) transferred from one node 102 to a second node 102 and is stored on in the memory 114 of the second node 102.

For purposes of illustration, only one of the nodes 102 shown in FIG. 1 is described here as acting as a TFTP server (and is also referred to here as the "server" node 102) while the other node 102 shown in FIG. 1 is described here as acting as a TFTP client (and is also referred to here as the "client" node 102). However, it is to be understood that a node 102 can act as both a TFTP server and TFTP client, depending on the particular application for which the system 100 is intended.

The TFTP software 124 in the server node 102 includes TFTP server software 130 that implements the server side of the TFTP protocol as a part of the UDP/IP stack 120. The TFTP server software 130 can be implemented, for example, as a daemon (or other background service or process).

The TFTP software 124 in the client node 102 includes TFTP client software 132 that implements the client side of the TFTP protocol. Although the TFTP client software 132 is logically considered to be a part of the UDP/IP stack 120, at least a part of the TFTP client software 132 can be integrated directly into an item of software that is otherwise considered to reside outside of the UDP/IP stack 120 (for example, application-layer software 122). Also, at least a part of the TFTP client software 132 can be implemented as a library (or other similar mechanism) that other software (for example, application-layer software 122) can link to in order to use the TFTP client software 132 to carry out the client side of the TFTP protocol.

The TFTP server software 130 and the TFTP client software 132 communicate with one another over the network 104 using one or more UDP ports (typically UDP port number 69).

In the embodiment shown in FIG. 1, the extended TFTP functionality 128 includes file retry option functionality 134. The accelerated file retry option functionality 134 is used to implement a TFTP option extension for retrying transfer of a file starting at a particular block. The file transfer is retried at the next block after the last block that was successfully transferred. The TFTP file retry option functionality 134 enables transfer of a file (or other grouping of data) to be retired after transfer of the file does not complete successfully by starting at the first block after the last successfully transferred block of the file. This TFTP file retry option functionality 134 functions without requiring the use of other software outside of the TFTP software 126 to retry the file transfer where it left off.

In this embodiment, the extended TFTP functionality 128 is implemented using the option negotiation mechanism described in IETF RFC 2374 (TFTP Option Extension). As noted in IETF RFC 2374, the option negotiation mechanism described therein is a backward-compatible extension to standard TFTP. It allows file transfer options to be negotiated prior to the transfer using a mechanism that is consistent with the request packet format used in standard TFTP.

In general, the option negotiation mechanism described in RFC 2374 involves the TFTP client sending a TFTP request packet to a TFTP server, where the TFTP request packet contains one or more options appended to it. The request may be a read request (requesting a data transfer from the TFTP server to the TFTP client) or write request (requesting a data transfer from the TFTP client to the TFTP server, which stores the transferred data).

If the TFTP server supports option negotiation as defined in IETF RFC 2347 and the TFTP server recognizes one or more of the options specified in the request packet, the TFTP server responds with an Options Acknowledgment (OACK) packet. Each option the server recognizes, and accepts the value for, is included in the OACK. If a server implementation does not support option negotiation, the server will likely ignore any options appended to the TFTP client's request. In this case, the TFTP server will return a data (DATA) packet (as specified in standard TFTP) for a read request (RRQ) and an acknowledgment (ACK) packet (as specified in standard TFTP) for a write request (WRQ), in both cases thereafter proceeding with normal TFTP data transfer. Also, the TFTP server will respond with an error (ERROR) packet (as specified in standard TFTP) if the TFTP server denies the TFTP client's request for whatever reason.

FIG. 2A illustrates one embodiment of a TFTP request packet 200 to which an accelerated file retry option 202 has been appended using the TFTP Option Extension mechanism described in IETF RFC 2347. The accelerated file retry option 202 shown in FIG. 2A is used to transfer a particular segment of a larger grouping of data such as a file or memory image.

The TFTP request packet 200 comprises an operation code field 204 (referred to herein as the "opcode" or "opc" field), a file name field 206, and a mode field 208. The opcode field 204, file name field 206, and mode field 208 are used in the manner specified for standard TFTP. For example, the opcode field 204 is used to indicate what type of request is being made with the request packet 200. As defined in standard TFTP, a 1 is stored in the opcode field 204 if a file read request is being made and a 2 is stored in the opcode field 204 if a file write request is being made. The name of the file being transferred is stored in the filename field 206. The mode field 208 is used to specify the particular standard TFTP file transfer mode to be used for the requested file transfer (that is, "netascii," "octet," or "mail").

After the mode field 208, any number of options can be appended to the TFTP request packet 200. The term "option," as used in connection with a TFTP request packet, refers to a pair of fields that are used to request that a particular optional function be used in connection with the transfer requested in the request packet.

In this example, an accelerated file retry option 202 is appended to the TFTP request packet 200. The accelerated file retry option 202 includes an option field 210 and a value field 212. The option field 210 includes a predetermined string that identifies that the accelerated file retry option should be used to carry out the requested file transfer. One example of a suitable predetermined string is "retry". The value field 212 for the accelerated file retry option 202 is used to identify at least one of the last block acknowledged as successfully transferred or the next block after the last block acknowledged as successfully transferred. In exemplary embodiments, the value field 212 comprises block data that defines the partial file characteristics of the partial TFTP file transfer. In exemplary embodiments, value field 212 comprises multiple sub-fields. One exemplary embodiment of the formatting of the value field 212 for the accelerated file retry option 202 is shown in FIG. 2A (though it is understood that the value field 212 can be formatted in different ways). In the exemplary embodiment shown in FIG. 2A, the value field 212 of the accelerated file retry option 202 includes a block number sub-field 214 and a quantity of blocks sub-field 216, where each sub-field is separated by a "slash" or other character.

The block number sub-field 214 indicates either the block number at which to start the file transfer or the last block number that was successfully transferred. In exemplary embodiments, the block number value is the ASCII representation of the decimal value. For example, "10" would indicate block 10, "100" would indicate block 100, and "1010" would indicate block 1010. In exemplary embodiments, the block number value is the ASCII representation of the hexadecimal value. For example, "10" would indicate block 16, "100" would indicate block 256, and "1010" would indicate block 4112. In exemplary embodiments where the block number sub-field 214 indicates the last block number that was successfully transferred, the next block is set as the block at which to start the file transfer. Where the TFTP request packet 200 is used to make a read request, block number sub-field 214 is used to specify which block of the file the TFTP server should start reading for the file transfer retry from the TFTP server to the TFTP client. Where the TFTP request packet 200 is used to make a write request, block number sub-field 214 is used to specify which block of the file the TFTP server should start writing for the file transfer retry from the TFTP client to the TFTP server.

The quantity of blocks sub-field 216 indicates the total quantity of blocks to transfer starting with the block identified by the block number field. In exemplary embodiments, the quantity of blocks value is the ASCII representation of the decimal value. For example, "1" would indicate 1 block only, "10" would indicate 10 blocks, "100" would indicate 100 blocks, etc. In exemplary embodiments, the quantity of blocks value is the ASCII representation of the hexadecimal value. For example, "1" would indicate 1 block only, "10" would indicate 16 blocks, "100" would indicate 256 blocks, etc. In exemplary embodiments where this field is set to the ASCII string "all", the transfer is to include all the remaining TFTP blocks in the file starting with the block identified by the block number field.

FIGS. 2B-2C illustrate various examples of TFTP request packets 200 having an accelerated file retry option 202 appended thereto. In the example shown in FIG. 2B, the operation code field 204 contains a 1, which indicates that it is a read request; and the value field 212 of the accelerated file retry option contains the string "5/all", which indicates that the starting block number of the file for the retry is 5 and that all the remaining blocks of the file after block 5 should be transferred. In the example shown in FIG. 2C, the operation code field 204 contains a 2, which indicates that it is a write request; and the value field 212 of the accelerated file retry option contains the string "8/1", which indicates the starting block number of the file for the retry is 8 and that only one block (block 8) should be transferred.

Figure 3A:
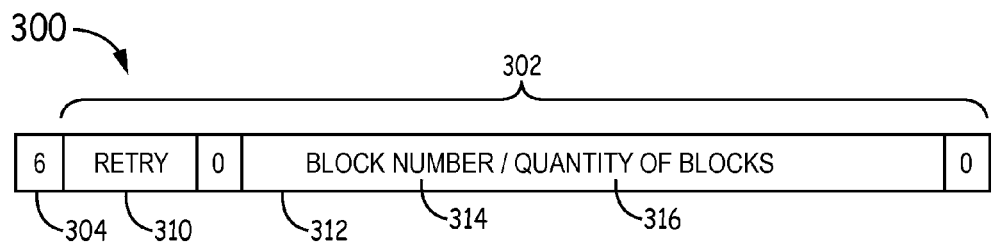
FIGS. 3A-3C illustrate examples of TFTP Options Acknowledgment (OACK) packets that are responsive to the particular example TFTP request packet shown in FIG. 2B.

FIG. 3A illustrates one embodiment of a TFTP Options Acknowledgment (OACK) packet 300 for responding to the TFTP request packet 200 of FIG. 2A that has an accelerated file retry option 202 appended thereto. The OACK packet 300 has an accelerated file retry option 302 appended to it.

The TFTP OACK packet 300 includes an opcode field 304, which for an OACK packet contains the value "6" and indicates that the packet 300 is an OACK packet. As noted above, an OACK packet 300 will contain a corresponding option for each option that was appended to the corresponding request that the server recognizes and handles. The term "option", as used in connection with a TFTP OACK packet, refers to a pair of fields that are used to respond to a request that a particular optional function be used in connection with the transfer requested in the request packet.

In the particular example shown in FIG. 3A, the OACK packet 300 contains a single option (the accelerated file retry option 302) that corresponds to the accelerated file retry option 202 appended to the request packet 200. In exemplary embodiments, the accelerated file retry option 302 in the OACK packet 300 has the same format as the accelerated file retry option 202 in the request packet 200, though this is not required.

The accelerated file retry option 302 includes an option field 310 and a value field 312. In exemplary embodiments, the option field 310 includes the same predetermined string used in the accelerated file retry option 202 in the request packet 200 to request that the accelerated file retry option be used to carry out the requested file transfer. As noted above, in this example, string "retry" is used. As with the accelerated file retry option 202 in the request packet 200, the value field 312 in the OACK packet 300 comprises a string that comprises multiple sub-fields. In the exemplary embodiment shown in FIG. 3A, the value field 312 of the accelerated file retry option 302 includes a block number sub-field 314 and a quantity of blocks 316 sub-field, where each sub-field is separated by a slash or other character. Except as described below, each sub-field in the value field 312 of the OACK packet 300 is used to store the same information as in the request packet 200.

When a TFTP server receives a TFTP request packet 200 having an accelerated file retry option 202 appended thereto, the TFTP server checks to make sure it can support the accelerated file retry option 202. If that is the case, the TFTP server responds with an OACK packet 300 in which the accelerated file retry option 302 contains the same information as the accelerated file retry option 202 appended to the corresponding TFTP request packet.

After sending the OACK packet 302, the TFTP server and TFTP client proceed with the retry of the transfer of the requested file using the values specified in the value field 312 of the OACK packet 300. Specifically, the TFTP server and TFTP client will retry the transfer of the requested file starting at the identified block and optionally only transferring a defined quantity of blocks.

Figure 3B:
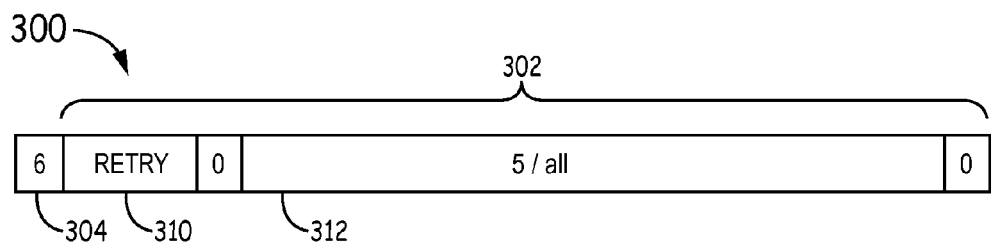
Figure 3C:
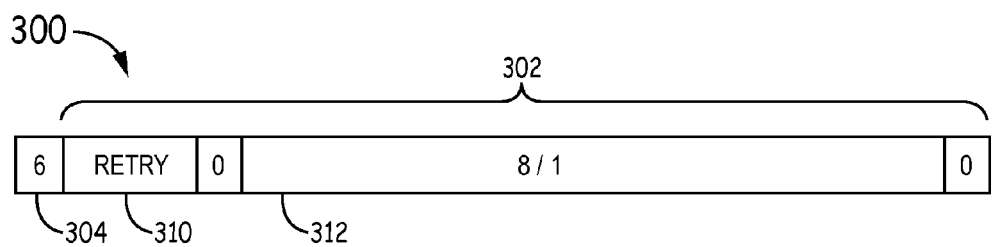

FIGS. 3B-3C illustrate examples of OACK packets 300 that are responsive to the particular example TFTP request packets shown in FIGS. 2B-2C. FIG. 3B illustrates an OACK packet 300 that is sent if the TFTP server can support the accelerated file retry option of the corresponding request packet 200 shown in FIG. 2B. As shown in FIG. 3B, the accelerated file retry option 302 of this OACK packet 300 contains the same information (that is, "5/all") as the accelerated file retry option 202 appended to the example TFTP request packet shown in FIG. 2B.

FIG. 3C illustrates an OACK packet 300 that is sent if the TFTP server can support the accelerated file retry option of the corresponding request packet 200 shown in FIG. 2C. As shown in FIG. 3C, the accelerated file retry option 302 of this OACK packet 300 contains the same information (that is, "8, 1") as the accelerated file retry option 202 appended to the example TFTP request packet shown in FIG. 2C.

Figure 4A:
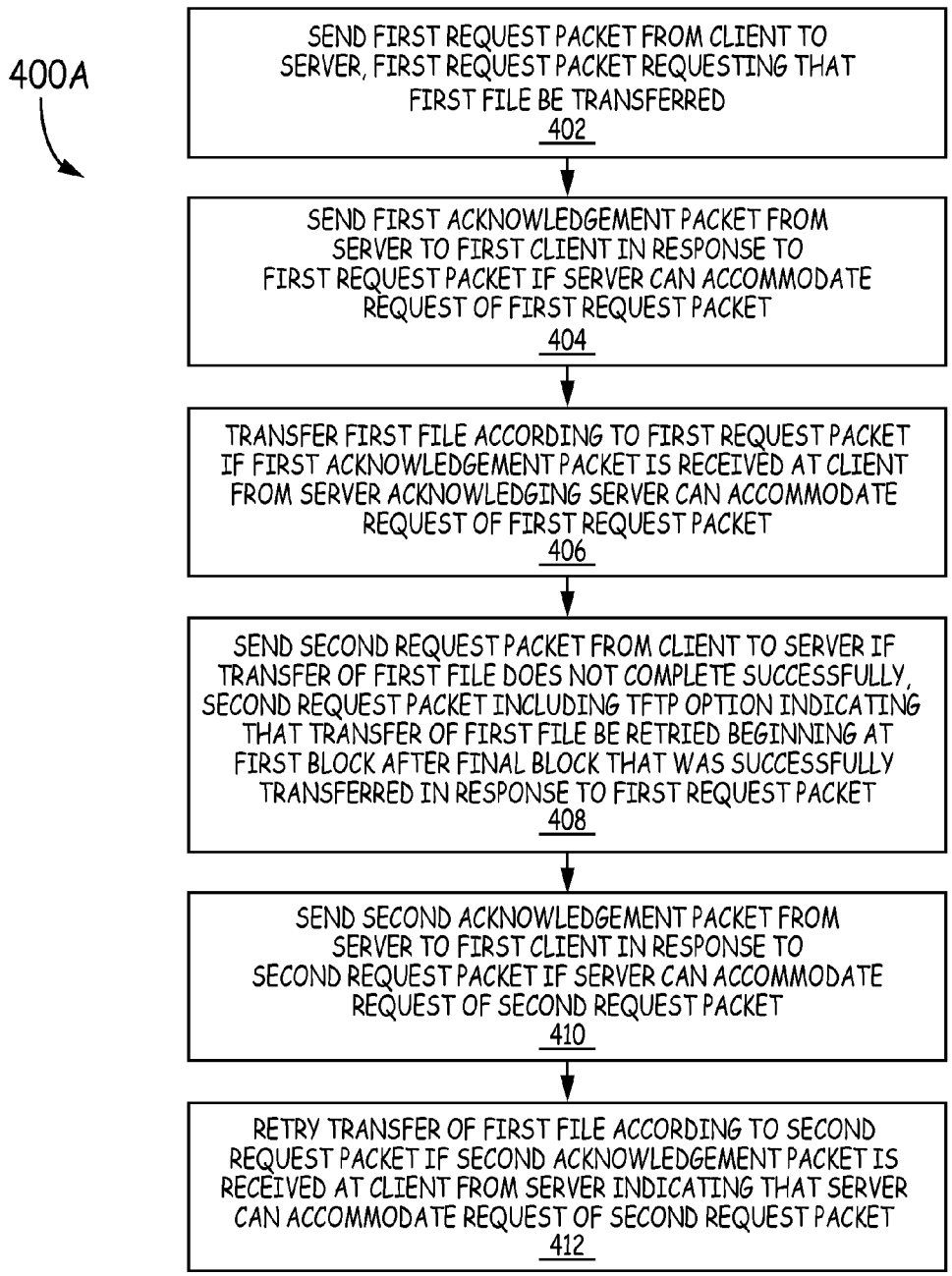
FIGS. 4A-4D are flow diagrams of one embodiment of methods for implementing the client side and server side of an accelerated file retry option described herein.
Figure 4B:
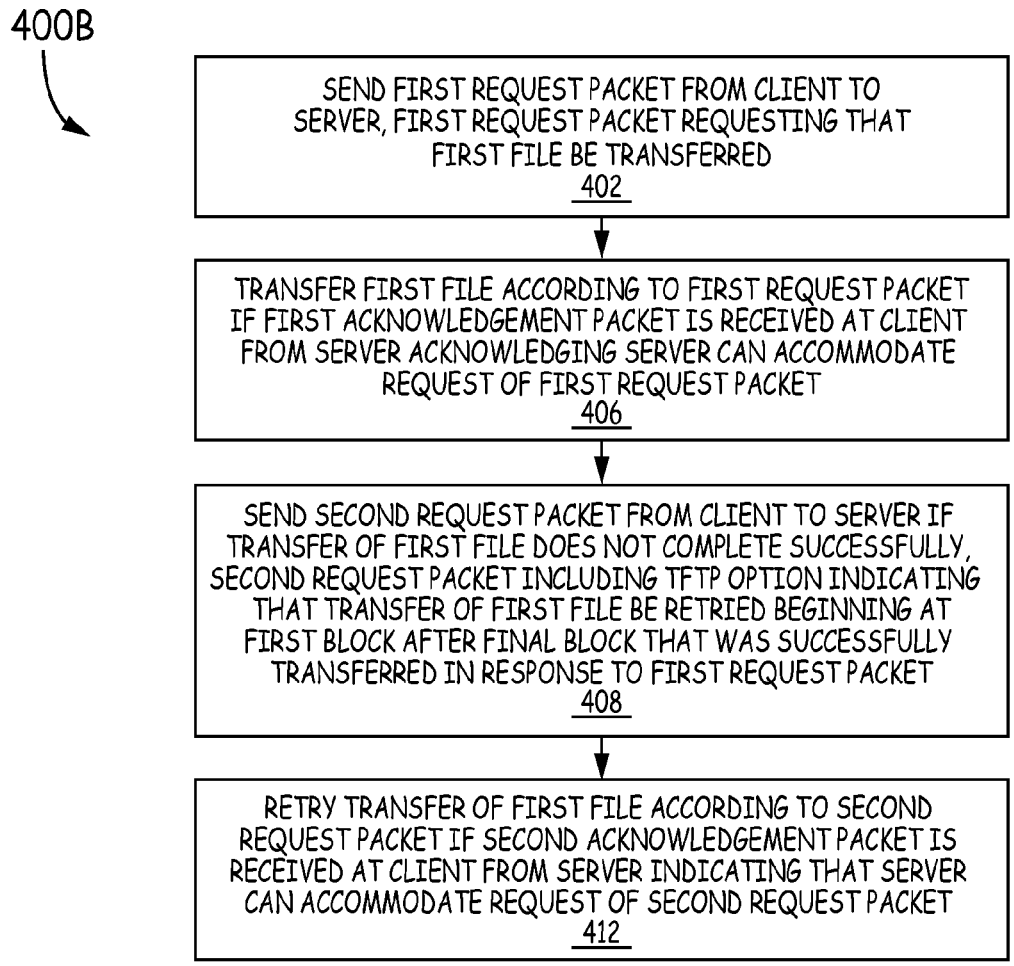

FIGS. 4A and 4B are flow diagrams of one embodiment of methods 400A-400D for implementing the client side and server side of the accelerated file retry option described above. The embodiments of methods 400A-400D may be implemented by the TFTP client software 132 in the client node 102 and the TFTP server software 130 in the server node 102, respectively. In exemplary embodiments, methods 400A-400D are used when a TFTP requests are being made with the accelerated file retry option after unsuccessful TFTP file transfer between the client node 102 and the server node 102. When a TFTP request is being made with the accelerated file retry option, the data that is to be transferred is transferred beginning at the first block after the last successfully transferred block of the file.

FIG. 4A is a flow diagram of a first method 400A for implementing both the client and server side of the accelerated file retry option described above. At block 402, a first request packet is sent from the client to the server, the first request packet requesting that the first file be transferred. As noted above, there are two types of requests that can be sent—a read request (where the data to be transferred is transferred from the server node 102 to the client node 102) or a write request (where the data to be transferred is transferred from the client node 102 to the server node 102).

At block 404, a first acknowledgement packet is sent from the server to the first client in response to the first request packet if the server can accommodate the request of the first request packet. Thus, the TFTP server determines if it supports the accelerated file retry option and acknowledges if it does. At block 406, the first file is transferred according to the first request packet if the first acknowledgement packet is received at the client from the server acknowledging the server can accommodate the request of the first request packet.

At block 408, a second request packet is sent from the client to the server if the transfer of the first file does not complete successfully. The second request packet includes a TFTP option indicating that transfer of the first file be retried beginning at the first block after the final block that was successfully transferred in response to the first request packet. At block 410, a second acknowledgment packet is sent from the server to the first client in response to the second request packet if the server can accommodate the request of the second request packet. A block 412, the first file transfer is retried according to the second request packet if the second acknowledgement packet is received at the client from the server indicating that the server can accommodate the request of the second request packet.

In the case of a read request, the TFTP server retries the transfer of the file to the client starting at the first block after the last successfully transmitted block as indicated in the retry option. In the case of a write request, the TFTP client retries the transfer of the file to the server starting at the first block after the last successfully transmitted block as indicated in the retry option. If either the TFTP server or TFTP client do not support the accelerated file retry option, the TFTP retry option is ignored and the file is transmitted using standard TFTP. In exemplary embodiments, if the TFTP client does not receive an OACK in response to the request packet, either the client receives the file via standard TFTP or terminates the transfer with a TFTP ERROR packet. The processing described above in connection with block 408 through block 412 is repeated any time the transfer of the first file does not complete successfully. In the particular embodiment shown in FIG. 4A, each block of the first file is transferred in series. That is, after a block has been transferred, the TFTP client checks if there are any remaining blocks to transfer. If there are no remaining segments to transfer, the data transfer is complete.

FIG. 4B is a flow diagram of a second method 400B for implementing a client side of an accelerated file retry option described above. Method 400B includes client side specific blocks 402, 406, 408, and 412 as described above with reference to method 400A.

Figure 4C:
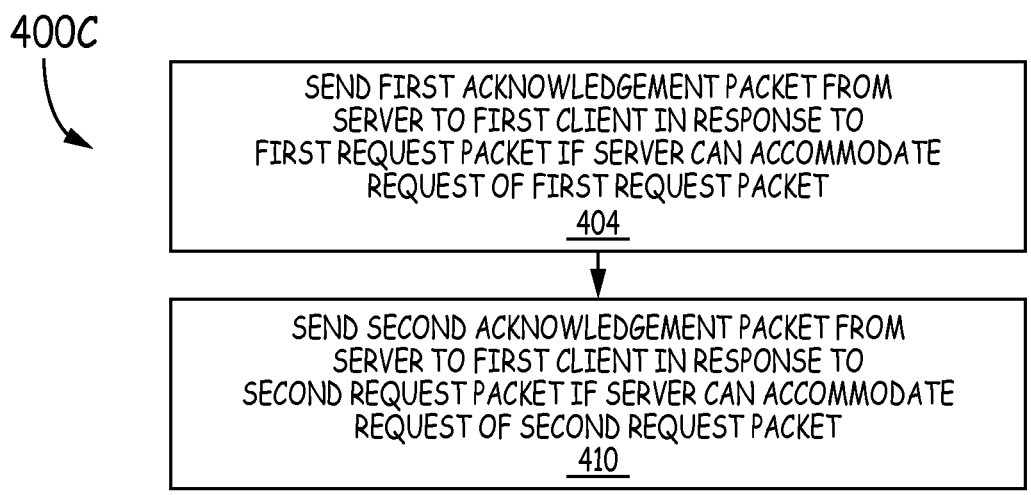

FIG. 4C is a flow diagram of a third method 400C for implementing a server side of an accelerated file retry option described above. Method 400C includes server side specific blocks 404 and 410 as described above with reference to method 400A.

Figure 4D:
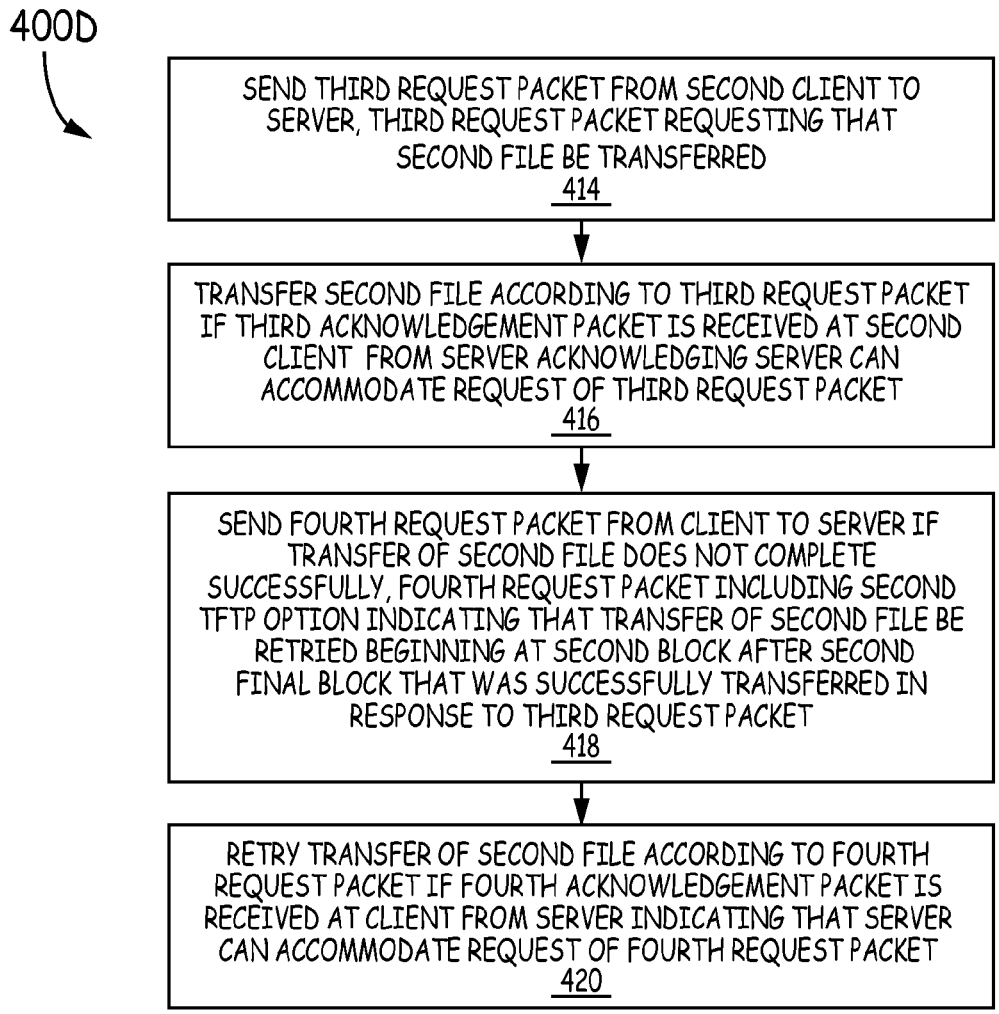

FIG. 4D is a flow diagram of a fourth method 400C for implementing a second client side of an accelerated file retry option described above for a second client in addition to what is implemented by any of methods 400A-400B. Method 400D begins at block 414 where a third request packet is sent from a second client to the server, the third request packet requesting that a second file be transferred. At block 416, the second file is transferred according to the third request packet if a third acknowledgment packet is received at the second client from the server acknowledging that the server can accommodate the request of the third request packet. At block 418, a fourth request packet is sent from the client to the server if the transfer of the second file does not complete successfully. The fourth request packet includes a second TFTP option indicating that the transfer of the second file be retried beginning at a second block after the second final block that was successfully transferred in response to the third request packet. At block 420, the transfer of the second file is retried according to the fourth request packet if the fourth acknowledgement packet is received at the client from the server indicating that the server can accommodate the request of the fourth request packet.

Although not shown in FIGS. 4A-4D, it is to be understood that appropriate error checking is typically also implemented in methods 400A-400D. For example, if the TFTP client specifies a block number that does not exist in a file or a quantity of blocks that would exceed the length of the blocks remaining in the file, the TFTP server sends a TFTP error packet.

Figure 5A:
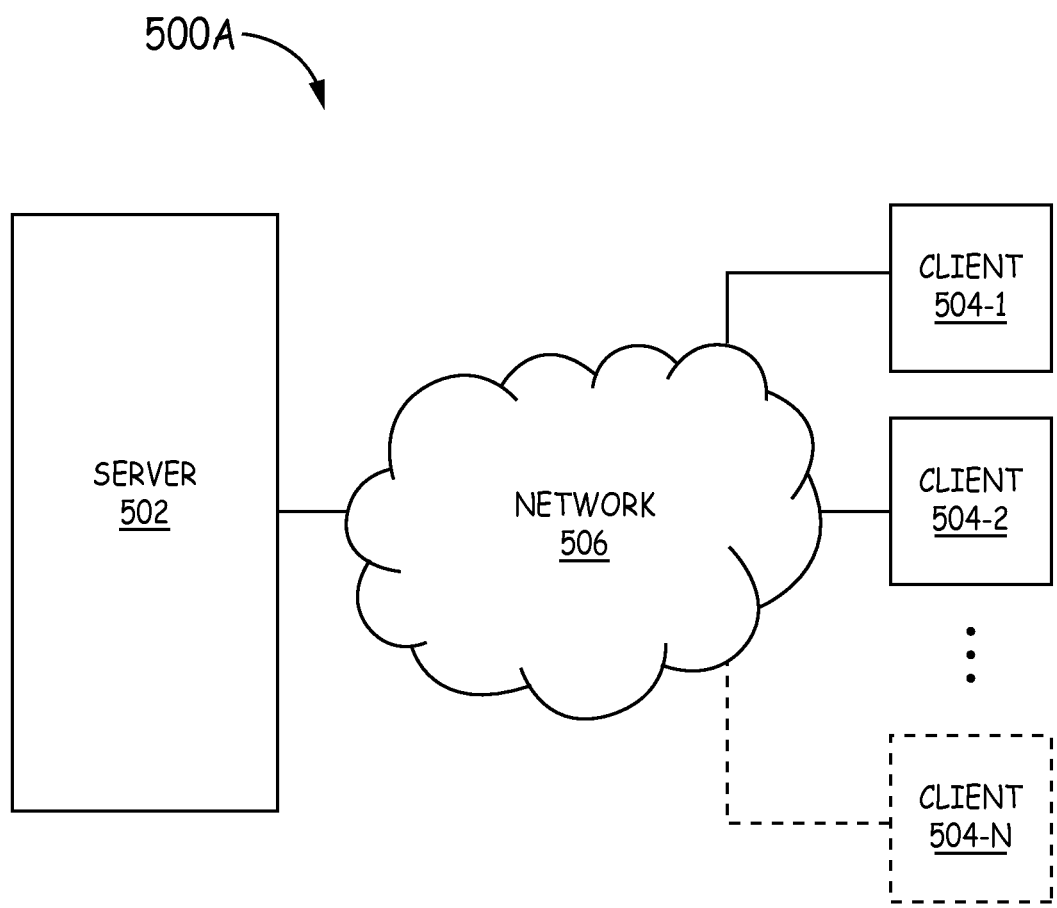
FIGS. 5A-5B are block diagrams of exemplary embodiments of systems that employ extended TFTP functionality to transfer files using an accelerated retry option.
Figure 5B:
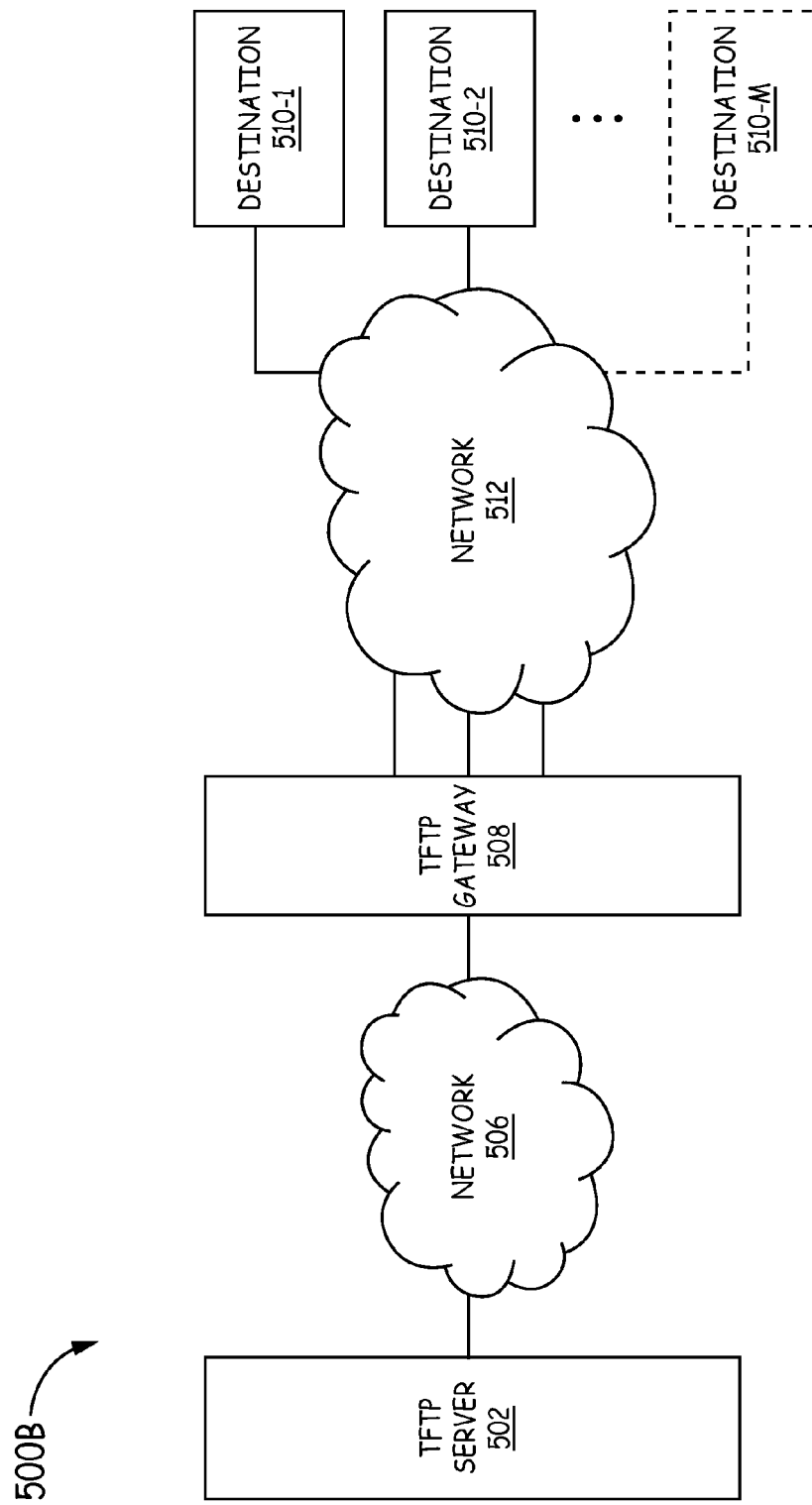

FIGS. 5A-5B are block diagrams of exemplary embodiments of systems 500 that employ extended TFTP functionality to transfer files using an accelerated retry option, labeled system 500A and system 500B respectively.

FIG. 5 is a block diagram of exemplary system 500A that employs extended TFTP functionality to transfer files using a retry option. The system 500A comprises a TFTP server 502 communicatively coupled to a plurality of TFTP clients 504 (including TFTP client 504-1, TFTP client 504-2, and any number of additional TFTP clients 504 through optional TFTP client 504-N) via a network 506, which can be implemented using wired and/or wireless communication links Each TFTP client 504 is configured to communicate with the TFTP server 502 using TFTP and the accelerated retry option as described above. As TFTP clients 504 request file transmission to/from the TFTP server 502, the files are transmitted, but may not successfully complete. This is compounded when numerous TFTP clients 504 are all requesting transfers from the TFTP server 502 simultaneously. When a file transmission does not successfully complete, the accelerated file retry TFTP option allows the client and server to continue the transmission right where the file transmission failed earlier instead of starting over at the beginning of the file per the standard TFTP functionality.

FIG. 5B is a block diagram of exemplary system 500B that employs extended TFTP functionality to transfer files using a retry option. The system 500B comprises a TFTP server 502 communicatively coupled to a TFTP gateway 508 via a network 506, which is communicatively coupled to a plurality of destinations 510 (including destinations 510-1, 510-2, and any number of additional destinations 510 through optional destination 510-M) via network 512. Each of networks 506 and network 512 can be implementing using wired and/or wireless communication links. The TFTP server 502 and the TFTP gateway 508 are each configured to communicate with one another using TFTP and the accelerated retry option as described above. Destinations 510 are the ultimate destinations of the TFTP data. In exemplary embodiments, the TFTP gateway 508 receives data blocks from the TFTP server 502, strips off the TFTP specifics from the data and immediately pushes the data payload to the destinations 510 without waiting for the entire TFTP file transfer to complete between the TFTP server 502 and the TFTP gateway 508 prior to pushing the file data on.

In an exemplary embodiments, one of the destinations 510 could miss some of the data payloads in the middle of the file due to an error, but resolve the error so that after a finite quantity of missed blocks so that the remainder of the data payloads are correctly received by the one of the destinations 510. Still, the finite quantity of blocks were missed in the middle of the file. In this embodiment, the accelerated retry option with the quantity of blocks sub-field 216 can be used to specifically request the blocks that were missed starting at the first missed blocks in the block number sub-field 214 and having a value in the quantity of blocks sub-field 216 that will cover the finite quantity of blocks that were missed without going through the remainder of the blocks of the entire rest of the file that were successfully transferred.

Figure 6:
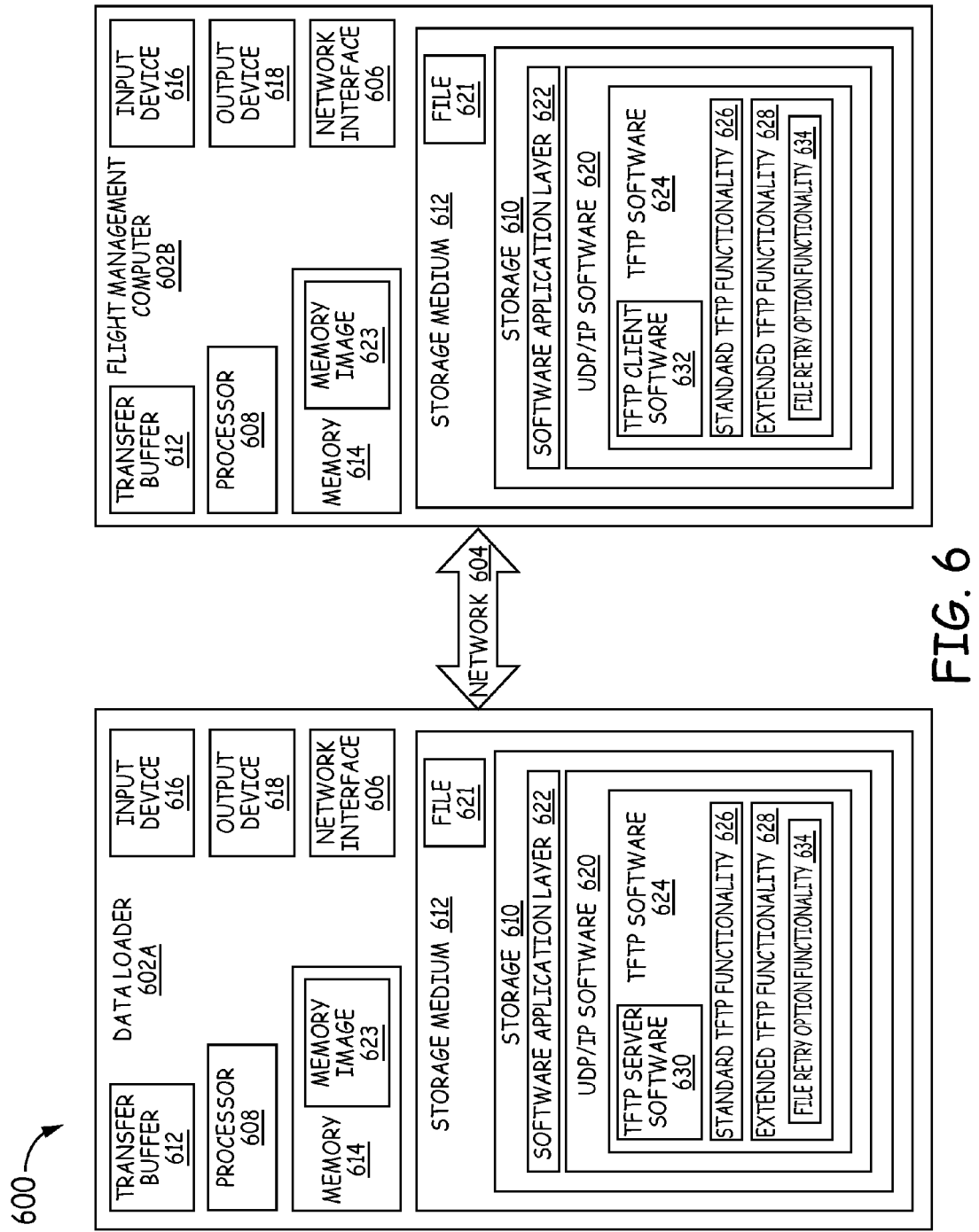
FIG. 6 is a block diagram of one embodiment of an avionics system that is suitable for use with the extended TFTP functionality described here.

FIG. 6 is a block diagram of one embodiment of an avionics system 600 that is suitable for use with the extended TFTP functionality described above. The avionics system 600 comprises a data loader 602A and a flight management computer (FMC) 602B that are implemented as separate nodes of a network 604. Both the data loader and the FMC 602 include an appropriate network interface 606 to communicatively couple to the network 604. In this embodiment, the network 604 is implemented to support the ARINC 615A standard, which uses ETHERNET networking technology and the UDP/IP suite of protocols.

In the embodiment shown in FIG. 6, each of the data loader 602A and the FMC 602B further comprise one or more processors 608 for executing software 610. The software 610 in the data loader 602A and the FMC 602B comprises program instructions that are stored (or otherwise embodied) on or in an appropriate storage medium or media 612 (such as flash or other non-volatile memory, magnetic disc drives, and/or optical disc drives) from which at least a portion of the program instructions are read by the processor 608 for execution thereby. Although the storage media 612 is shown in FIG. 6 as being included in, and local to, the data loader 602A and the FMC 602B, it is to be understood that removable media and/or remote storage media (for example, storage media that is accessible over the network 604) can also be used. The data loader 602A and the FMC 602B also includes memory 614 for storing the program instructions (and any related data) during execution by the processor 608. Memory 614 comprises, in one implementation, any suitable form of random access memory (RAM) now known or later developed, such as dynamic random access memory (DRAM). In other embodiments, other types of memory are used.

The data loader 602A and the FMC 602B further include one or more input devices 616 that are communicatively coupled to the respective processor 608 by which a user is able to provide input to that processor 608. Examples of input devices include a keyboard, keypad, touch-pad, pointing device, button, switch, and microphone. The data loader 602A and the FMC 602B also includes one or more output devices 618 that are communicatively coupled to the respective processor 608. Each processor 608 is able to output information or data to a user on or using one or more of the output devices 608. Examples of output devices 618 include visual output devices such as liquid crystal displays (LCDs) or light emitting diodes (LEDs) or audio output devices such as speakers.

The software 610 executed by the processor 608 in the data loader 602A and the FMC 602B includes UDP/IP software 620 and flight-management software 622 that implements various flight-management functions. The UDP/IP software 620 includes TFTP software 624. The TFTP software 624 includes standard TFTP functionality 626 that implements standard TFTP and extended TFTP functionality 628. The TFTP software 624 of the data loader 602A also includes TFTP server software 630 and the TFTP software 624 of the flight management computer 602B also includes TFTP client software 632. The extended TFTP functionality 628 includes file retry option functionality 634. The TFTP software 624, standard TFTP functionality 626, extended TFTP functionality 628, and file retry option functionality 634, are all the same as the TFTP software 124, standard TFTP functionality 126, extended TFTP functionality 128, and file retry option functionality 134 described above in connection with FIG. 1. In exemplary embodiments, the FMC 602B also includes appropriate interfaces for communicatively coupling the FMC 602B to one or more sensors and/or actuators with which the FMC 602B (and, for example, the flight-management software 622) communicates.

The FMC 602B is deployed within an aerospace vehicle (such as an airplane or helicopter). In operation, the FMC 602B provides flight-management related services for the vehicle and may include a terrain, navigation, and/or other databases. The data loader 602A includes updated files for the terrain, navigation, and/or other databases. These updated files can be very large and can take quite some time to transmit using TFTP over the relatively slow connection between the data loader 602A and the FMC 602B. This is compounded when a TFTP file transfer is not successful, as standard TFTP functionality requires the file transfer to start again at the beginning With some larger files, the probability of the files even completing may be low and the time required to complete the transfer when required to start over again many be high. In exemplary embodiment, the accelerated file retry option enables continuation of a TFTP file transfer where it was not successful so that it is not necessary to start over again at the beginning of the large file.

In this embodiment, standard TFTP software that would otherwise be provided for data loading purposes is extended to include the extended TFTP functionality 628 (including the accelerated file retry option functionality 634), which is used to continue the file transfer where at the block it stopped at. Because software that is used in avionics systems typically needs to be certified by an appropriate regulatory agency (for example, the Federal Aviation Agency (FAA) in the Unites States), the TFTP software 624 would need to be certified for use in avionics application. However, once certified, the TFTP software 624 with the extended TFTP functionality 628 can be used with different avionics system.

In another embodiment of an implementation of the TFTP extended features includes a personal computer for loading files or transferring a memory image onto a processor board (for example, a debugging station).

The methods and techniques described here may be implemented in digital electronic circuitry, or with a processor (for example, a special-purpose processor or a general-purpose processor such as a computer) firmware, software, or in combinations of them. Apparatus embodying these techniques may include appropriate input and output devices, a processor, and a storage medium tangibly embodying program instructions for execution by the processor. A process embodying these techniques may be performed by a processor executing a program of instructions to perform desired functions by operating on input data and generating appropriate output. The techniques may advantageously be implemented in one or more programs that are executable on a system including at least one processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

Example Embodiments

Example 1 includes a method of transferring data using a Trivial File Transport Protocol (TFTP), the method comprising: sending a first request packet from a client to a server, the first request packet requesting that a first file be transferred; transferring the first file according to the first request packet if a first acknowledgement packet is received at the client from the server indicating that the server can accommodate request of the first request packet; sending a second request packet from the client to the server if transfer of the first file does not complete successfully, the second request packet including a TFTP option indicating that transfer of the first file be retried beginning at a first block after a final block that was successfully transferred in response to the first request packet; and retrying the transfer of the first file according to the second request packet if a second acknowledgement packet is received at the client from the server indicating that the server can accommodate the request of the second request packet.

Example 2 includes the method of Example 1, wherein the first request packet comprises at least one a read request and a write request; transferring the first file according to the first request packet includes transferring the first file from the server to the client if the first request packet is a read request; and transferring the first file according to the first request packet includes transferring the first file from the client to the server if the first request packet is a write request.

Example 3 includes the method of any of Examples 1-2, wherein the TFTP option includes a retry starting block number identifying the first block after the final block that was successfully transferred in response to the first request packet.

Example 4 includes the method of any of Examples 1-3, wherein the TFTP option includes a retry block quantity identifying the quantity of blocks that will be retried in response to the second request packet, wherein the quantity of blocks is fewer than a total quantity of unsuccessfully transferred blocks remaining in the first file.

Example 5 includes the method of any of Examples 1-4, wherein the server is part of a data loader and the client is a part of a flight management computer; and wherein the first file is loaded onto the flight management computer from the data loader.

Example 6 includes the method of any of Examples 1-5, further comprising: sending a third request packet from a second client to the server, the third request packet requesting that a second file be transferred; transferring the second file according to the third request packet if a third acknowledgement packet is received at the second client from the server indicating that the server can accommodate the request of the third request packet; sending a fourth request packet from the client to the server if transfer of the second file does not complete successfully, the fourth request packet including a second TFTP option indicating that transfer of the second file be retried beginning at a second block after a second final block that was successfully transferred in response to the fourth request packet; and retrying the transfer of the second file according to the fourth request packet if a fourth acknowledgement packet is received at the second client from the server indicating that the server can accommodate the fourth request.

Example 7 includes the method of Example 6, wherein the first file and the second file are the same.

Example 8 includes a system implementing a Trivial File Transport Protocol (TFTP), the system comprising: a server having a first network interface, a first processor, and a storage device; a first client having a second network interface and a second processor, the first client communicatively coupled to the server; wherein the first client is configured to send a first request packet to the server, the first request packet requesting that a first file be transferred; wherein the first client is configured to transfer the first file according to the first request packet if a first acknowledgement packet is received at the first client from the server indicating that the server can accommodate request of the first request packet; wherein the first client is configured to send a second request packet to the server if the transfer of the first file does not complete successfully, the second request packet including a TFTP option indicating that transfer of the first file be retried beginning at a first block after a final block that was successfully transferred in response to the first request packet; and wherein the first client is configured to retry the transfer of the first file according to the second request packet and starting at the first block after the final block that was successfully transmitted if a second acknowledgement packet is received at the first client from the server indicating that the server can accommodate the request of the second request packet.

Example 9 includes the system of Example 8, further comprising: wherein the server is configured to send the first acknowledgment packet to the first client in response to the first request packet if the server can accommodate the request of the first request packet; and wherein the server is configured to send the second acknowledgment packet to the first client in response to the second request packet if the server can accommodate the request of the second request packet.

Example 10 includes the system of any of Examples 8-9, wherein the first request packet comprises at least one of a read request and a write request; wherein the first client is configured to receive the first file from the server if the first request packet is a read request; and wherein the first client is configured to transfer the first file to the server if the first request packet is a write request.

Example 11 includes the system of any of Examples 8-10, wherein the TFTP option includes a retry starting block number identifying the first block after the final block that was successfully transferred in response to the first request packet.

Example 12 includes the system of any of Examples 8-11, wherein the TFTP option includes a retry block quantity identifying the quantity of blocks that will be retried in response to the second request packet, wherein the quantity of blocks is fewer than a total quantity of unsuccessfully transferred blocks remaining in the first file.

Example 13 includes the system of any of Examples 8-12, wherein the server is part of a data loader and the client is a part of a flight management computer; and wherein the first file is loaded onto the flight management computer from the data loader.

Example 14 includes the system of any of Examples 8-13, further comprising: a second client having a third network interface and a third processor, the second client communicatively coupled to the server; wherein the second client is configured to send a third request packet to the server, the third request packet requesting that a second file be transferred; wherein the second client is configured to transfer the second file according to the third request packet if a third acknowledgement packet is received at the second client from the server indicating that the server can accommodate request of the third request packet; wherein the second client is configured to send a fourth request packet to the server if the transfer of the second file does not complete successfully, the fourth request packet including a second TFTP option indicating that transfer of the second file be retried beginning at a second block after a second final block that was successfully transferred in response to the third request packet; and wherein the second client is configured to retry the transfer of the second file according to the fourth request packet and starting at the second block after the second final block that was successfully transmitted if a fourth acknowledgement packet is received at the second client from the server indicating that the server can accommodate the request of the fourth request packet.

Example 15 includes the system of Example 14, wherein the first file and the second file are the same.

Example 16 includes a client implementing a Trivial File Transport Protocol (TFTP), the client comprising: a network interface to communicatively couple the client to a server; a processor communicatively coupled to the network interface, the processor configured to execute TFTP software; wherein the TFTP software is configured to cause the client to send a first request packet to the server, the first request packet requesting that a first file be transferred; wherein the TFTP software is configured to cause the client to transfer the first file according to the first request packet if a first acknowledgement packet is received at the client from the server indicating that the server can accommodate request of the first request packet; wherein the TFTP software is configured to cause the client to send a second request packet to the server if transfer of the first file does not complete successfully, the second request packet including a TFTP option indicating that transfer of the first file be retried beginning at a first block after a final block that was successfully transferred in response to the first request packet; and wherein the TFTP software is configured to cause the client to retry the transfer of the first file according to the second request packet and starting at the first block after the final block that was successfully transmitted if a second acknowledgement packet is received at the client from the server indicating that the server can accommodate the request of the second request packet.

Example 17 includes the client of Example 16, wherein the first request packet comprises at least one of a read request and a write request; wherein the TFTP software is configured to cause the client to receive the first file from the server if the first request packet is a read request; and wherein the TFTP software is configured to cause the client to transfer the first file to the server if the first request packet is a write request.

Example 18 includes the client of any of Examples 16-17, wherein the TFTP option includes a retry starting block number identifying the first block after the final block that was successfully transferred in response to the first request packet.

Example 19 includes the client of any of Examples 16-18, wherein the TFTP option includes a retry block quantity identifying the quantity of blocks that will be retried in response to the second request packet, wherein the quantity of blocks is fewer than a total quantity of unsuccessfully transferred blocks remaining in the first file.

Example 20 includes the client of any of Examples 16-19, wherein the server is part of a data loader and the client is a part of a flight management computer; and wherein the first file is loaded onto the flight management computer from the data loader.

What is claimed is:

1. A method of transferring data using a Trivial File Transport Protocol (TFTP), the method comprising:
    sending a first request packet from a client to a server, the first request packet requesting that a first file be transferred;
    transferring the first file according to the first request packet if a first acknowledgement packet is received at the client from the server indicating that the server can accommodate request of the first request packet;
    sending a second request packet from the client to the server if transfer of the first file does not complete successfully, the second request packet including a TFTP option indicating that transfer of the first file be retried beginning at a first block after a final block that was successfully transferred in response to the first request packet, wherein the TFTP option includes a retry block quantity identifying a quantity of blocks that will be retried in response to the second request packet, wherein the quantity of blocks is fewer than a total quantity of unsuccessfully transferred blocks remaining in the first file; and
    retrying the transfer of the first file according to the second request packet if a second acknowledgement packet is received at the client from the server indicating that the server can accommodate the request of the second request packet.

2. The method of claim 1, wherein the first request packet comprises at least one a read request and a write request;
    transferring the first file according to the first request packet includes transferring the first file from the server to the client if the first request packet is a read request; and
    transferring the first file according to the first request packet includes transferring the first file from the client to the server if the first request packet is a write request.

3. The method of claim 1, wherein the TFTP option includes a retry starting block number identifying the first block after the final block that was successfully transferred in response to the first request packet.

4. The method of claim 1, wherein the server is part of a data loader and the client is a part of a flight management computer; and
    wherein the first file is loaded onto the flight management computer from the data loader.

5. The method of claim 1, further comprising:
sending a third request packet from a second client to the server, the third request packet requesting that a second file be transferred;
transferring the second file according to the third request packet if a third acknowledgement packet is received at the second client from the server indicating that the server can accommodate the request of the third request packet;
sending a fourth request packet from the client to the server if transfer of the second file does not complete successfully, the fourth request packet including a second TFTP option indicating that transfer of the second file be retried beginning at a second block after a second final block that was successfully transferred in response to the fourth request packet; and
retrying the transfer of the second file according to the fourth request packet if a fourth acknowledgement packet is received at the second client from the server indicating that the server can accommodate the fourth request.

6. The method of claim 5, wherein the first file and the second file are the same.

7. A system implementing a Trivial File Transport Protocol (TFTP), the system comprising:
a server having a first network interface, a first processor, and a storage device;
a first client having a second network interface and a second processor, the first client communicatively coupled to the server;
wherein the first client is configured to send a first request packet to the server, the first request packet requesting that a first file be transferred;
wherein the first client is configured to transfer the first file according to the first request packet if a first acknowledgement packet is received at the first client from the server indicating that the server can accommodate request of the first request packet;
wherein the first client is configured to send a second request packet to the server if the transfer of the first file does not complete successfully, the second request packet including a TFTP option indicating that transfer of the first file be retried beginning at a first block after a final block that was successfully transferred in response to the first request packet, wherein the TFTP option includes a retry block quantity identifying the quantity of blocks that will be retried in response to the second request packet, wherein the quantity of blocks is fewer than total quantity of unsuccessfully transferred blocks remaining in the first file; and
wherein the first client is configured to retry the transfer of the first file according to the second request packet and starting at the first block after the final block that was successfully transmitted if a second acknowledgement packet is received at the first client from the server indicating that the server can accommodate the request of the second request packet.

8. The system of claim 7, further comprising:
wherein the server is configured to send the first acknowledgment packet to the first client in response to the first request packet if the server can accommodate the request of the first request packet; and
wherein the server is configured to send the second acknowledgment packet to the first client in response to the second request packet if the server can accommodate the request of the second request packet.

9. The system of claim 7, wherein the first request packet comprises at least one of a read request and a write request;
wherein the first client is configured to receive the first file from the server if the first request packet is a read request; and
wherein the first client is configured to transfer the first file to the server if the first request packet is a write request.

10. The system of claim 7, wherein the TFTP option includes a retry starting block number identifying the first block after the final block that was successfully transferred in response to the first request packet.

11. The system of claim 7, wherein the server is part of a data loader and the client is a part of a flight management computer; and
wherein the first file is loaded onto the flight management computer from the data loader.

12. The system of claim 7, further comprising:
a second client having a third network interface and a third processor, the second client communicatively coupled to the server;
wherein the second client is configured to send a third request packet to the server, the third request packet requesting that a second file be transferred;
wherein the second client is configured to transfer the second file according to the third request packet if a third acknowledgement packet is received at the second client from the server indicating that the server can accommodate request of the third request packet;
wherein the second client is configured to send a fourth request packet to the server if the transfer of the second file does not complete successfully, the fourth request packet including a second TFTP option indicating that transfer of the second file be retried beginning at a second block after a second final block that was successfully transferred in response to the third request packet; and
wherein the second client is configured to retry the transfer of the second file according to the fourth request packet and starting at the second block after the second final block that was successfully transmitted if a fourth acknowledgement packet is received at the second client from the server indicating that the server can accommodate the request of the fourth request packet.

13. The system of claim 12, wherein the first file and the second file are the same.

14. A client implementing a Trivial File Transport Protocol (TFTP), the client comprising:
a network interface to communicatively couple the client to a server;
a processor communicatively coupled to the network interface, the processor configured to execute TFTP software;
wherein the TFTP software is configured to cause the client to send a first request packet to the server, the first request packet requesting that a first file be transferred;
wherein the TFTP software is configured to cause the client to transfer the first file according to the first request packet if a first acknowledgement packet is received at the client from the server indicating that the server can accommodate request of the first request packet;
wherein the TFTP software is configured to cause the client to send a second request packet to the server if transfer of the first file does not complete successfully, the second request packet including a TFTP option indicating that transfer of the first file be retried beginning at a first block after a final block that was successfully transferred in response to the first request packet, wherein the TFTP option includes a retry block quantity identifying the quantity of blocks that will be retried in response to the second request packet, wherein the quantity of blocks is fewer than a total quantity of unsuccessfully transferred blocks remaining in the first file; and wherein the TFTP software is configured to cause the client to retry the transfer of the first file according to the second request packet and starting at the first block after the final block that was successfully transmitted if a second acknowledgement packet is received at the client from the server indicating that the server can accommodate the request of the second request packet.

15. The client of claim 14, wherein the first request packet comprises at least one of a read request and a write request;

wherein the TFTP software is configured to cause the client to receive the first file from the server if the first request packet is a read request; and wherein the TFTP software is configured to cause the client to transfer the first file to the server if the first request packet is a write request.

16. The client of claim 14, wherein the TFTP option includes a retry starting block number identifying the first block after the final block that was successfully transferred in response to the first request packet.

17. The client of claim 14, wherein the server is part of a data loader and the client is a part of a flight management computer; and wherein the first file is loaded onto the flight management computer from the data loader.

* * * * *